Oct. 2, 1951 — A. H. KORN — 2,569,567
APPARATUS FOR SEPARATING DUST FROM DUST-LADEN AIR
Filed Sept. 4, 1948 — 2 Sheets-Sheet 1
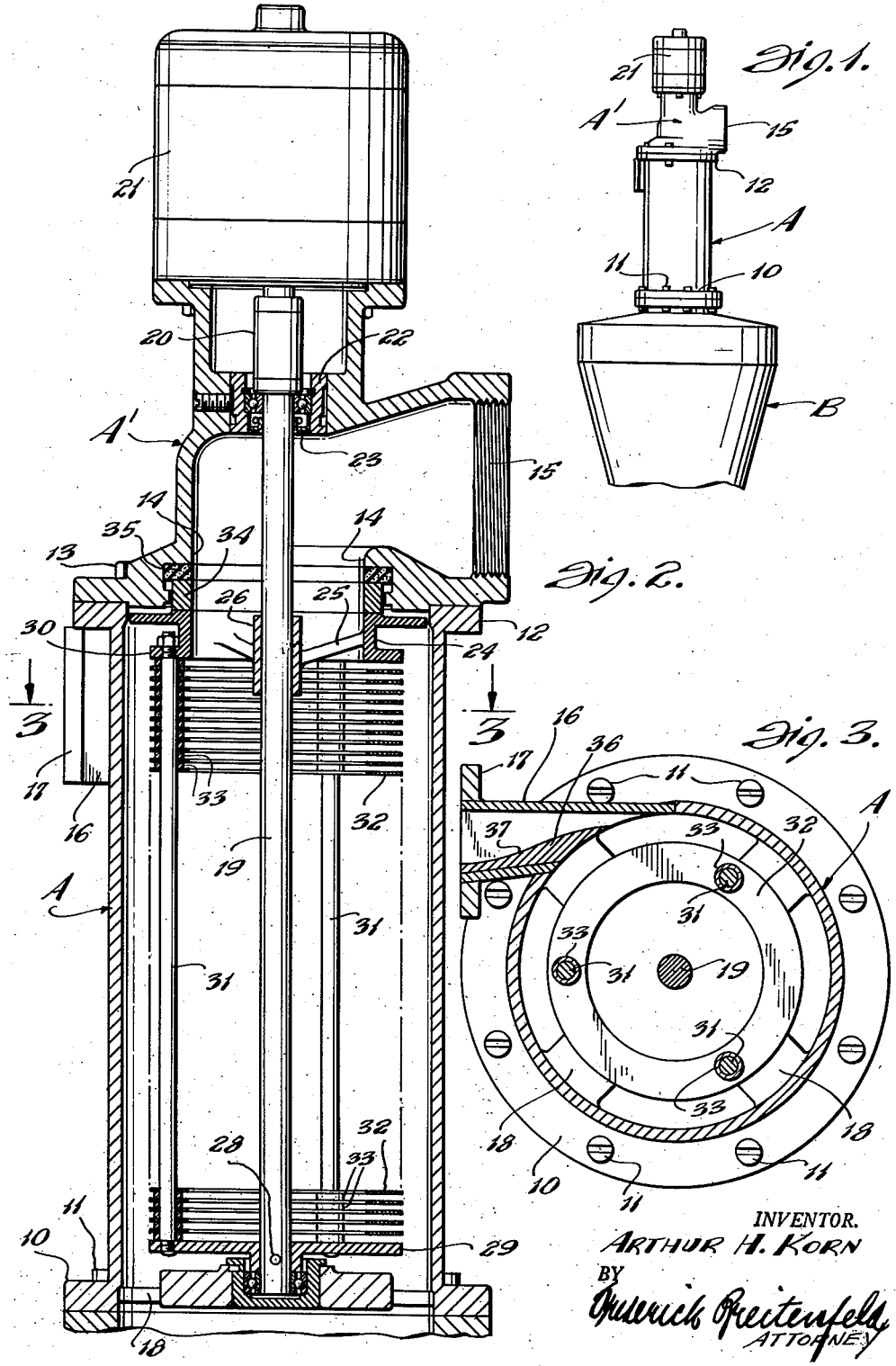
INVENTOR.
ARTHUR H. KORN

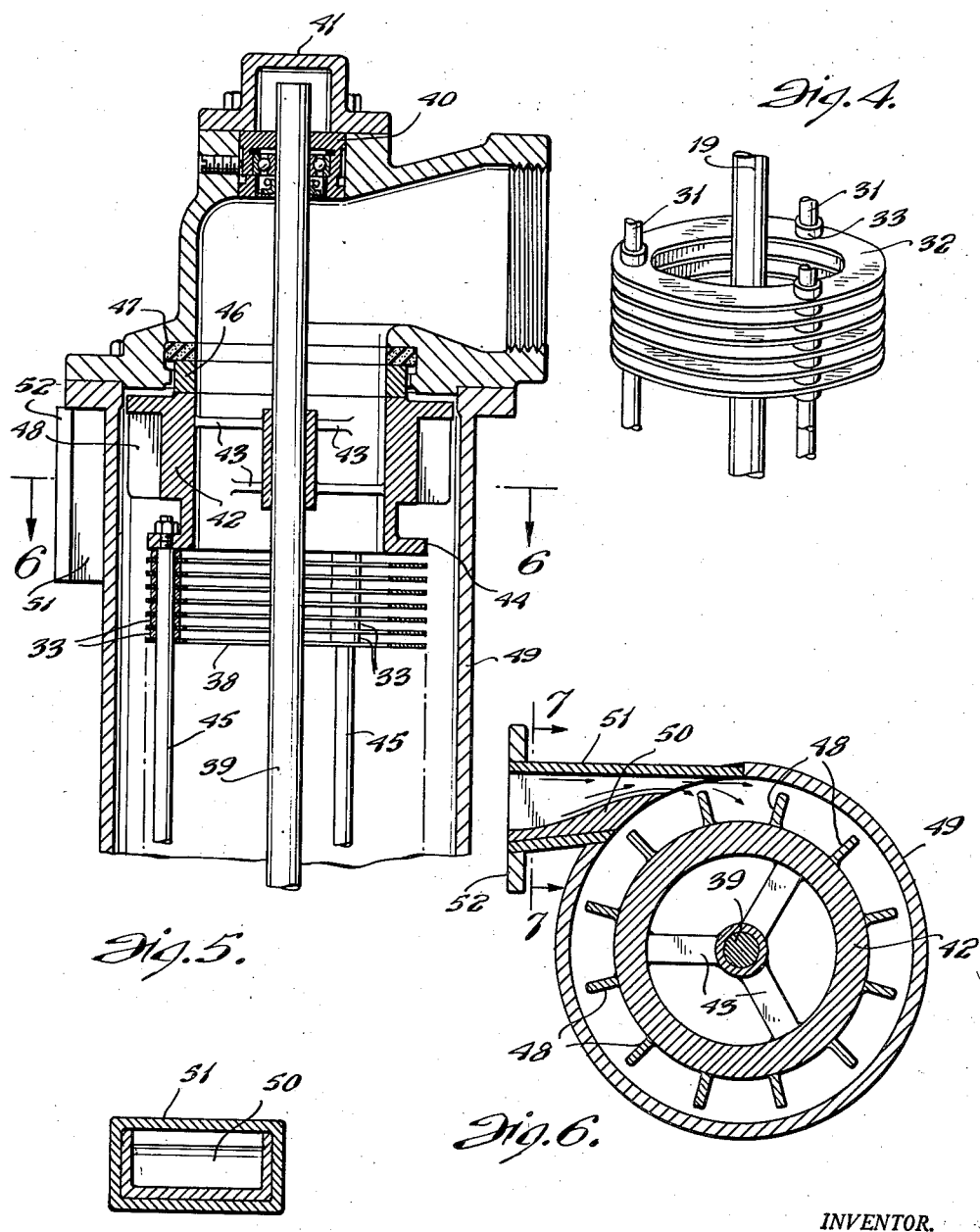

Patented Oct. 2, 1951

2,569,567

UNITED STATES PATENT OFFICE 2,569,567

APPARATUS FOR SEPARATING DUST FROM DUST-LADEN AIR

Arthur H. Korn, New York, N. Y.

Application September 4, 1948, Serial No. 47,864

4 Claims. (Cl. 183—77)

My present invention relates generally to separation of materials, and has particular reference to an improved method and apparatus for separating solid particles from a gas.

The invention is useful for a variety of well-known purposes, and is not restricted to any particular use. For example, it may be employed in the transportation and delivery of finely powdered materials, in the recovery of fine powders or particles from exhausts and other gas streams, or in the removal of dust particles from a gas stream which is to be purified.

For the sake of simplicity, reference may hereinafter be made to "air" streams, or to "dust"-laden "air." It will be understood, however, that in each case the term "air" is to have a broader significance to include gases generally, and the term "dust" is intended to include within its significance any particles of solid matter regardless of their size or composition.

The principal object of the invention is to provide a method and apparatus which are more effective in accomplishing the desired separation, and efficient even for the handling of relatively small quantities of air or dust. A subordinate objective is to provide a relatively simple and unusually compact apparatus which may be manufactured and maintained in efficient operation at relatively small expense.

It is common knowledge that centrifugal separators are more effective for the larger particles than for the smaller ones. A conventional "cyclone" separator may be completely effective to separate particles of a size over 100 microns, but it is less effective for particles of smaller size, and usually it is not effective at all for particles smaller than 25 microns. It is a particular object of the present invention to provide an improved procedure and apparatus by means of which particles as small as 15 microns, or even smaller, may be reliably separated from a gas, while at least an appreciable percentage of particles having a size of 1 micron may also be separated.

It is my belief that the efficiency of ordinary centrifugal separators is impaired by turbulence in the air flow, as a result of which particles which have once been centrifugally separated from the air stream are frequently and repeatedly recaptured by the air stream and carried along with it. The present invention is predicated upon the provision of a means for minimizing this turbulence.

Briefly stated, the present improved method consists in causing the dust-laden air to rotate within a confined space of circular cross-section, thereby causing the solid particles therein to be thrown out centrifugally, withdrawing the dust-free air in an axial direction, and so controlling the flow of the air that during its movement toward the region of withdrawal it is separated into a plurality of substantially unimpeded transverse streams in which a non-turbulent laminar flow is induced to take place.

The present improved apparatus is one which brings about this result in a wholly practical and economically feasible manner.

I achieve these general objects and advantages, and such other objects and advantages as may hereinafter appear or be pointed out, in the manner illustratively exemplified in the accompanying drawings, in which:

Fig. 1 is an exterior elevational view of a typical separator constructed in accordance with the present invention and shown in association with a typical hopper for receiving the separated solid particles;

Fig. 2 is an enlarged elevational cross-section through the essential parts of the separator of Fig. 1;

Fig. 3 is a cross-sectional view taken substantially along the line 3—3 of Fig. 2;

Fig. 4 is a fragmentary perspective view showing the nature of the spaced annular discs forming part of the rotor;

Fig. 5 is a view similar to Fig. 2, illustrating the upper part of a separator of modified construction;

Fig. 6 is a cross-sectional view taken substantially along the line 6—6 of Fig. 5; and Fig. 7 is a cross-sectional view taken substantially along the line 7—7 of Fig. 6.

Referring to Fig. 1, the separator therein illustrated by way of example has a separating chamber A of circular cross-section and of cylindrical shape. This chamber is arranged with its axis vertical. At the bottom it is provided with an attachment flange 10 by means of which it may be secured to a hopper or equivalent receptacle B, the attachment being effected by bolts 11 or the like.

At the top end of the cylinder A there is a similar attachment flange 12 by means of which the cylinder is connected by bolts 13 or the like, to an extension A'. This extension has an opening 14 in its bottom wall, which is coaxially arranged with respect to the chamber A. It also has a lateral opening 15 to which any suitable conduit or pipe may be connected.

The opening 15 is an outlet for the air stream passing through the separator. The inlet is in the upper part of the chamber A and consists of a tangentially arranged passage 16 of substantially rectangular cross-section. At its end, the passage 16 is provided with an attachment flange 17 by means of which connection is established with any suitable inlet pipe or conduit. Usually, if such conduit is of circular cross-section, a transition fitting (not shown) is interposed.

In the lower end of the chamber A there is a supporting spider 18 within which the lower end of a rotor shaft 19 is suitably journaled, as shown. The shaft 19 extends axially through the chamber A and its upper end is suitably connected as at 20 with the shaft of a driving motor 21. The upper end of the shaft 19 is also suitably journaled as at 22 in the upper part of the chamber portion A', as shown. In the latter journal assembly, there is included an oil seal 23, of well-known construction per se, which serves not only to prevent lubricating material to escape downwardly into the air stream, but also to prevent air from leaking upwardly through the journal part 22.

Near the lower end of the shaft 19, it is secured by means of a pin 28 to a plate 29. Mounted upon the shaft 19, at the upper end of the chamber A, is an annulus 24. The support of this annulus is preferably achieved by means of a series of radial arms 25 which connect with a hub 26. Extending between the plate 29 and the flange part 30 of the annulus 24 are a series of circumferentially spaced posts or tie rods 31. I have illustratively shown three such posts arranged at 120° intervals. They are screw-threaded or otherwise secured at their opposite ends, respectively, to the flange 30 and to the plate 29. These posts pass through and support in spaced stacked relation a plurality of annular discs 32. The shapes of these discs, and their relationship to one another and to the supporting posts 31 and the shaft 19, are best depicted in Fig. 4. Spacer elements 33 may be mounted upon the posts 31 between each pair of discs 32 in order to maintain these discs in predetermined spaced relationship.

The posts or tie rods 31, and the spacers 33, are designed to have cross-sectional dimensions which are as small as possible.

The uppermost disc is as close to the flange 30 as it is to the adjacent disc below it. Similarly, the endmost disc at the bottom is as close to the plate 29 as to the adjacent disc above it.

The shaft 19 and the parts carried by it, viz., the annulus 24, the plate 29, and the stack of annular discs 32, constitute a rotor which is coaxially mounted within the chamber A and it is adapted to be set into rotation by means of the motor 21.

In order to establish a substantially air-tight seal between the upper end of this rotor and the wall of the chamber, I mount a sealing ring 34, preferably composed of carbon, in the lower wall of the chamber part A'. The ring 34 is in constant rubbing contact with the upper surface of the annulus 24, and it is maintained in this rubbing contact by means of a resilient backing ring 35, preferably composed of sponge rubber or the like. The ring 35 bears upwardly against a downwardly-directed shoulder formed in the part A'.

In operation, dust-laden air is introduced into the tangential inlet 16. The movement of the air into and through the separator is accomplished by establishing a suitable pressure differential between the inlet and the outlet. The entering air stream embarks upon a rotative movement as a result of the circular cross-section of the chamber into which it enters. The speed of this rotation will depend upon the pressure differential which is established between the inlet and the outlet, also upon the characteristics of the internal contour of the inlet 16. In order to establish varying inlet velocities, an insert 36 is removably supported within the inlet 16. The contour of this insert (note the curvature of the surface 37 in Fig. 3) is of nozzle-defining character, and imparts a corresponding character and velocity to the entering air stream.

During the rotative movement of the air stream within the chamber A, the dust particles in the air are thrown out centrifugally, and fall by gravity toward the bottom of the chamber A, thence into the hopper or receptacle B. In order for the air to travel to the outlet 15, it is necessary for it to pass inwardly through the spaces between the discs 32. It is constrained to do this because the inlet opening 16 communicates only with the space on the outside of the rotor, while the outlet 15 communicates only with the space on the inside of the rotor, and the air seal afforded by the ring 34 rubbing against the annulus 24 prevents any by-passing of the air stream from the inlet to the outlet. Also, the proximity of the plate 29 to the endmost disc 32 prevents the air stream from traveling around the lower end of the rotor into the inside of the rotor.

The motor 21 is so chosen or regulated that the peripheral velocity of the discs 32 is substantially the same as, or slightly greater than, the speed of the rotating air stream. This helps to keep the air in a state of rotation for a protracted period, and any drag of the disc peripheries upon the air is one which accelerates the rotation and thus enhances the centrifugal dust-separating action. Of primary importance is the fact that the air is subdivided into a plurality of superposed transverse streams during its travel from the wall portion of the chamber A to the axial region of this charber. These transverse streams are impeded to a minimum extent (only by the spacers 33) and are of such narrow and flattened character as to induce a laminar flow. In this way, the turbulence which normally impairs the efficiency of a centrifugal separator is almost completely eliminated, and at least minimized to a highly desirable degree.

The spacing of the discs 32 will depend upon the radial velocity of the air through the spaces between them. This, in turn, is determined by the pressure differential with which the apparatus is used, the length of the rotor, and the outside diameter of the discs themselves. If the discs are spaced too far apart, the desired laminar flow will not be induced. If the discs are spaced too closely together, they will obstruct the passage of air. A suitable spacing in a separator passing 1 cubic foot of air per second, with a rotor 1 foot long, having an outside diameter of about 4 inches, and rotating at about 3400 R. P. M., is $\tfrac{3}{16}$ of an inch. It will be understood, however, that these figures are purely illustrative, and that the invention is not restricted to any particular size of the parts or capacity of the apparatus as a whole.

In the modified construction shown in Figs. 5 and 6, a stack of spaced annular discs 38 is supported, in the manner hereinbefore described, upon a rotor shaft 39. In this case, however, the upper end of the rotor shaft is journaled as at 40 in the upper part of the chamber but is not connected to any outside motive power. A cap 41 is secured over the upper end of the shaft.

The motive power for the shaft 39 is obtained by mounting a turbine wheel upon this shaft in the region of the entering air. This turbine is designated by the reference numeral 42 and is shaped to constitute an annulus supported by radial arms 43 upon the shaft 39. This annulus, as before, is provided with a flanged part 44 to which the longitudinal posts 45 are secured, these posts passing through and supporting the discs 38. Also as before, the upper surface of the annulus 42 is maintained in rubbing contact with a sealing ring 46 by means of a resilient sponge rubber ring 47.

Formed on the periphery of the annulus 42 are vanes 48 which extend toward but terminate short of the wall of the chamber 49, as shown most clearly in Fig. 6. These vanes are arranged in the path of the entering air stream, and this air stream is controlled by the contour of the removable insert 50. It will be noted that this contour is such that the insert serves not only as a nozzle-defining instrument, but also as a deflector to direct the incoming air stream toward the space beyond the vanes 48. This deflection prevents the solid dust particles in the entering air stream from impinging upon the vanes 48 and thus protects the vanes against undue wear or abrasion. Also, since the dust particles may be traveling at a speed slower than that of the air stream, a deflection of these particles away from the vanes prevents impairment of the propelling effect of the air against these vanes.

In view of the fact that the tangential inlet opening 51 (corresponding to the inlet 16 of Fig. 3) is slightly tapered inwardly, as shown, the insert 50 may be held in position by simply contouring its outer surfaces in similar fashion. Once placed in position, it cannot shift inwardly because of the taper referred to; and it cannot slip rearwardly after suitable connection has been established at the connecting flange 52.

The device illustrated in Figs. 5 and 6 functions substantially the same as that previously described.

In each of the embodiments illustrated, to prevent undue abrasion, that part of the wall of the separating chamber against which the entering air stream impinges, may be constructed in replaceable fashion, as is well-known.

As an indication of the unique advantages achieved by the present invention, an installation of the character hereinbefore illustratively mentioned (having a rotor 1 foot long, an outside diameter of 4 inches, a disc spacing of $\frac{3}{16}$ of an inch, a speed of rotation of 3400 R. P. M., and a capacity of 1 cubic foot per second) efficiently separates virtually 100 per cent of all particles of dust having a size greater than 15 microns, and separates correspondingly smaller percentages of particles of even smaller sizes.

By rotating the air faster, or by making the rotor larger in diameter, or both, a greater centrifugal action may be achieved, as a result of which an even finer separation of dust particles can be accomplished. A similar result is capable of accomplishment by cutting down on the volume of air which passes through the apparatus in a given interval of time.

The ability to separate dust down to a particle size approaching 1 micron is an advantage which will be readily appreciated by those skilled in the industrial arts. The applicability of the present invention to pigments and colloidal graphites will be apparent.

The invention is also useful in the recovery of fine powders from air streams and other gases. For example, it may be used in the recovery of valuable metallic vapor condensations from furnace gases.

The invention is particularly suited for use in the picking up, transportation, and delivery of finely powdered dry materials in various production operations. For example, in any production process in which powdered or granular material is to be moved from place to place (from mixer to mill, from mill to sifter, from any item of manufacturing equipment to filling machine, etc.) the present procedure and invention are unusually efficient and useful.

The applicability of the invention to the charging and periodic replenishing of feed hoppers, for packaging machines, molding machines, tablet presses, and the like, is obvious.

In general, it will be understood that the details herein described and illustrated are in many respects of purely illustrative character, to explain the nature, purpose and mode of operation of the process and apparatus. Many of these details may obviously be modified by those skilled in the art without necessarily departing from the spirit and scope of the invention as expressed in the appended claims.

Having thus described my invention and illustrated its use, what I claim as new and desire to secure by Letters Patent is:

1. In a separator of the character described, an axially-vertical chamber of circular cross-section, a rotor coaxially mounted within said chamber and comprising a stack of spaced annular discs concentric with the rotor axis, a tangential inlet for dust-laden air communicating with the space on the outside of said rotor, an air outlet communicating with the space on the inside of said rotor, means constraining the air passing through said chamber to travel inwardly through the spaces between said discs, and means for rotating said rotor in the direction of air movement to accelerate the rotative component of said movement and induce a laminar non-turbulent air flow through said spaces, said means comprising a turbine wheel carried by the rotor and positioned in the region of the entering air for propulsion thereby.

2. In a separator of the character described, a chamber of circular cross-section, a rotor coaxially mounted therein and comprising a stack of spaced annular discs concentric with the rotor axis, a tangential inlet for dust-laden air communicating with the space on the outside of said rotor, an air outlet communicating with the space on the inside of said rotor, and means for rotating said rotor in the direction of air movement, said means comprising a turbine wheel carried by the rotor and positioned in the region of the entering air for propulsion thereby, said turbine wheel being provided on its periphery with vanes extending toward but terminating short of the wall of said chamber, and a deflector in said air inlet for guiding the entering air stream toward the annular space beyond said vanes, said deflector having a contour which produces a propulsion jet.

3. A separator constructed as set forth in claim 2 wherein said deflector comprises an insert removably supported within said air inlet and provided with a nozzle-defining contour which controls the velocity of the entering air stream.

4. In a separator of the character described, a tubular chamber, a shaft mounted axially within the chamber and rotatably supporting a stack of axially spaced members transverse to said shaft which form an axial passage adjacent the shaft, an inlet for dust-laden air communicating with the space outside of said members, an air outlet communicating with said passage, means constraining the air passing through said chamber to travel inwardly through the spaces between said members and means for rotating said shaft and members in the direction of air movement, said last named means comprising a turbine wheel carried by the shaft and positioned in the region of the entering air for propulsion thereby.

ARTHUR H. KORN.

REFERENCES CITED

The following references are of record in the file of this patent:

UNITED STATES PATENTS

| Number | Name | Date |
| --- | --- | --- |
| 262,183 | Hogan | Aug. 1, 1882 |
| 1,505,564 | Jett | Aug. 19, 1924 |
| 2,119,478 | Whiton | May 31, 1938 |
| 2,126,481 | Lapp et al. | Aug. 9, 1938 |

FOREIGN PATENTS

| Number | Country | Date |
| --- | --- | --- |
| 620,108 | France | Jan. 12, 1927 |